United States Patent [19]
Saffran

[11] Patent Number: 5,503,468
[45] Date of Patent: Apr. 2, 1996

[54] APPARATUS FOR SIMULTANEOUSLY APPLYING BRAKES OF A TOWED VEHICLE HAVING A SELF CONTAINED BRAKING SYSTEM WHEN BRAKES OF A TOWING VEHICLE ARE APPLIED

[75] Inventor: Gene E. Saffran, Red Deer, Canada

[73] Assignee: Gordon Wilbur Chiles, Red Deer, Canada; a part interest

[21] Appl. No.: 264,444

[22] Filed: Jun. 23, 1994

[51] Int. Cl.$^6$ ........................................................ B60T 7/20
[52] U.S. Cl. .................................. 303/7; 188/3 H; 60/538
[58] Field of Search ........................... 303/20, 3, 7, 9.61, 303/12, 18, 19, 113.4, 114.2, 114.3; 188/345, 346, 3 R, 3 H; 60/534, 537, 538, 545

[56] References Cited

U.S. PATENT DOCUMENTS

| | | | |
|---|---|---|---|
| 2,674,349 | 4/1954 | Phillips | 188/3 H |
| 4,056,286 | 11/1977 | Burkett | 303/20 |
| 4,066,996 | 1/1978 | Davis | 303/20 X |
| 4,398,771 | 9/1983 | McCurry et al. | 303/15 |
| 4,418,963 | 12/1983 | Sprockhoff | 303/3 |
| 4,671,578 | 6/1987 | Rothen et al. | 303/15 |
| 4,756,390 | 7/1988 | Meadows | 188/3 H |
| 5,031,729 | 7/1991 | Wittkop et al. | 188/3 H |
| 5,411,321 | 5/1995 | Harness | 188/3 H X |

FOREIGN PATENT DOCUMENTS 2726514 12/1978 Germany.

Primary Examiner—Josie Ballato
Attorney, Agent, or Firm—Anthony R. Lambert

[57] ABSTRACT

An apparatus for simultaneously applying brakes of a towed vehicle having a self contained braking system when brakes of a towing vehicle are applied is described. This apparatus includes a vacuum pump linked with a vacuum booster in the braking system of the towed vehicle thereby providing vacuum pressure to the vacuum booster. A servomotor linked with a brake pedal in the braking system of the towed vehicle. Upon activation, the servomotor provides force to move the brake pedal thereby applying the brakes in the towed vehicle. A pedal position sensor is linked with the brake pedal in the towing vehicle, whereby the brake pedal position of the towing vehicle is sensed. An encoder is linked with the pedal position sensor. The encoder receives data from the pedal position sensor regarding the brake pedal position of the towing vehicle and encodes such data. A decoder is linked with the encoder and the servomotor. The decoder receives an encoded signal from the encoder regarding the brake pedal position of the towing vehicle and sends a decoded signal to the servomotor to move the brake pedal of the towed vehicle thereby creating a master to slave connection between the brake pedal of the towing vehicle and the brake pedal of the towed vehicle.

4 Claims, 2 Drawing Sheets

APPARATUS FOR SIMULTANEOUSLY APPLYING BRAKES OF A TOWED VEHICLE HAVING A SELF CONTAINED BRAKING SYSTEM WHEN BRAKES OF A TOWING VEHICLE ARE APPLIED

The present invention relates to an apparatus for simultaneously applying brakes of a towed vehicle having a self contained braking system when brakes of a towing vehicle are applied.

BACKGROUND OF THE INVENTION

Many motor home owners tow an automobile behind their motor home. The automobile is used for short local trips when the motor home owner arrives at his destination. The automobile has a self contained braking system, that is pedal activated.

Most jurisdictions require a braking system on the towed vehicle that cooperates with the braking system on the motor home. There are no commercially viable systems for connecting the braking system of a motorhome to a vehicle being towed to allow simultaneous application of the brakes of both vehicles. This has resulted in many motor home owners towing automobiles without an operative braking system on the towed vehicle, in contravention of the law.

What makes this application difficult is that the automobile towed by the motorhome has its own self contained braking system. Usually the system is a closed hydraulic system with a master cylinder that is operated by an operator depressing the brake pedal. Typically, a vacuum booster is incorporated between the brake pedal and the master cylinder which employs vacuum drawn from the intake manifold of the vehicles engine to assist the braking action.

Attempts have been made, in the past, to operate the braking system of a towed vehicle where the vehicle towed has its own self contained braking system. U.S. Pat. No. 4,398,771 which issued to McCurry et al, discloses a braking system for a towed vehicle. U.S. Pat. No. 2,674,349 which issued to Phillips, discloses a brake connection between two vehicles which requires the hydraulic circuit of the vehicle being towed to be rerouted. U.S. Pat. No. 4,756,390 to Leon Meadows, discloses a vacuum connection system between two vehicles which requires the use of long vacuum lines. The drawback of using such long vacuum lines is that they are subject to deterioration and perforation which leads directly to a loss of braking effectiveness. Such a system also experiences an unacceptable lag time for the brakes of the towed vehicle to be applied after the brakes of the towing vehicle have been applied.

SUMMARY OF THE INVENTION

What is required is a system for simultaneously applying brakes of a towed vehicle having a self contained braking system when brakes of a towing vehicle are applied.

In accordance with one aspect of the present invention there is provided an apparatus for simultaneously applying brakes of a towed vehicle having a self contained braking system when brakes of a towing vehicle are applied which includes a vacuum pump linked with a vacuum booster in the braking system of the towed vehicle thereby providing vacuum pressure to the vacuum booster. A servomotor linked with a brake pedal in the braking system of the towed vehicle. Upon activation, the servomotor provides force to move the brake pedal thereby applying the brakes in the towed vehicle. A pedal position sensor is linked with the brake pedal in the towing vehicle, whereby the brake pedal position of the towing vehicle is sensed. An encoder is linked with the pedal position sensor. The encoder receives data from the pedal position sensor regarding the brake pedal position of the towing vehicle and encodes such data. A decoder is linked with the encoder and the servomotor. The decoder receives an encoded signal from the encoder regarding the brake pedal position of the towing vehicle and sends a decoded signal to the servomotor to move the brake pedal of the towed vehicle thereby creating a master to slave connection between the brake pedal of the towing vehicle and the brake pedal of the towed vehicle.

Although beneficial results may be obtained through the use of the apparatus, as described above, often there will be a difference between the sensitivity of the brake pedal of the towed vehicle as compared to the brake pedal of the towing vehicle. Even more beneficial results may, therefore, be obtained when means is provided to adjust the signal received by the encoder from the pedal position sensor, thereby adjusting the signal sent from the encoder to the decoder regarding the amount of force exerted by the servomotor upon the brake pedal of the towed vehicle.

Although beneficial results may be obtained through the use of the apparatus, as described above, if the towed vehicle should become detached from the towing vehicle it is desirable that the brakes be applied to immediately stop the towed vehicle. Even more beneficial results may, therefore, be obtained when the linkage between the encoder and decoder includes means to automatically signal the decoder to have the servomotor exert a force upon the brake pedal of the towed vehicle should the linkage with the encoder become disconnected.

The apparatus, as described above, can be used with towing vehicles having either hydraulic or air brake systems. It allows simultaneous application of the brakes of the towed vehicle with those of the towing vehicle. It has a secondary capability, if the towed vehicle becomes unhooked from the towing vehicle, of causing the towed vehicle's brakes to be applied in full, which will stop the towed vehicle from running uncontrolled after separation.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred embodiment, an apparatus for simultaneously applying brakes of a towed vehicle having a self contained braking system when brakes of a towing vehicle are applied will now be described with reference to FIGS. 1 and 2.

Figure 1:
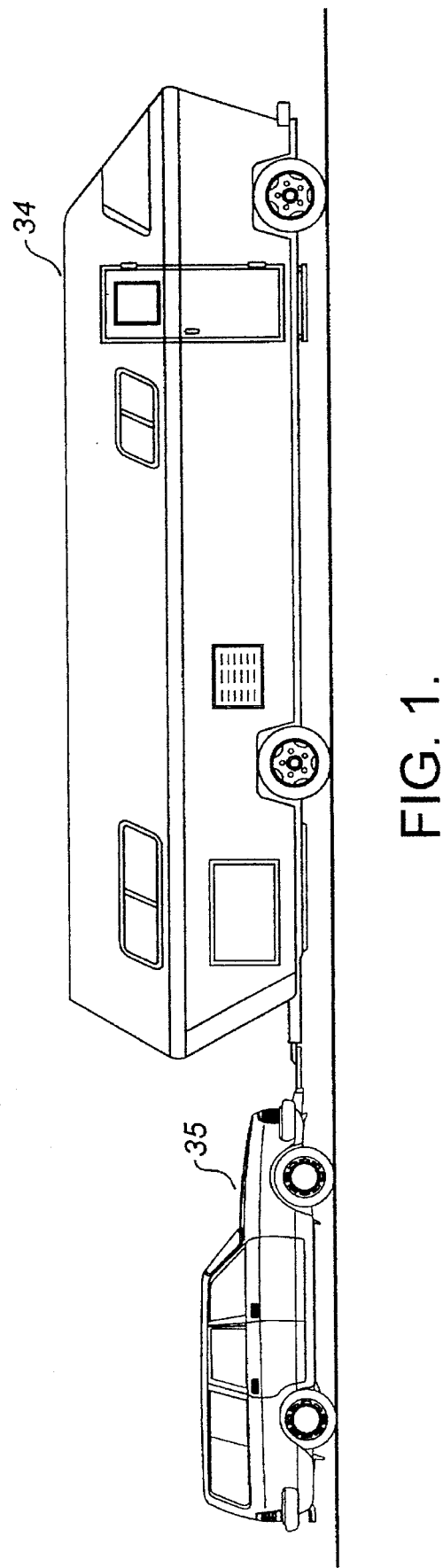
FIG. 1 is a side elevation view of a towing vehicle and a towed vehicle having a self contained braking system.

Referring to FIG. 1, there is illustrated a towing vehicle (34) and a towed vehicle (35). Referring to FIG. 2, a braking system of towing vehicle 34 includes a vacuum booster 27, a master cylinder 28, and a brake fluid reservoir 29. Two brake fluid lines 22 and 23 extend from master cylinder 28 to brakes positioned on the wheels (not shown). Referring to FIG. 2, the system includes a pedal position sensor (1) which is secured under the dash and connected by an arm (2) to a rod (3) that is connected to the brake pedal lever (38) of the towing vehicle. When the brakes of the towing vehicle are applied, the brake pedal lever (38) moves the pedal position sensor (1) sending a signal to the encoder (4). This signal is converted and in turn sent to the decoder (5) in the towed vehicle. Then, in turn a signal is sent to the motor drive (6) which is connected by a cable (7) to the brake pedal lever (37) in the towed vehicle. The motor drive applies the brakes of the towed vehicle proportionally to the towing vehicle's brakes. It may be increased or decreased proportionally as the need arises. There is virtually no lag time between the two brake systems (approx 0.23 sec). Power is supplied to the system by battery (16) of towing vehicle (34) and battery (15) of towed vehicle (35).

FIG. 1 illustrates a typical application of the present invention where a motorhome (34) tows a conventional vehicle (35). The present invention provides a system for applying the brakes of the towed vehicle (35) when the brakes of the motorhome (34) are applied. In the case of separation of the towed vehicle from the towing vehicle, the brakes of the towed vehicle will apply, stopping the towed vehicle. It should be noted that the stopping distance of the two vehicles is reduced significantly when the brakes of both vehicles are applied simultaneously.

Figure 2:
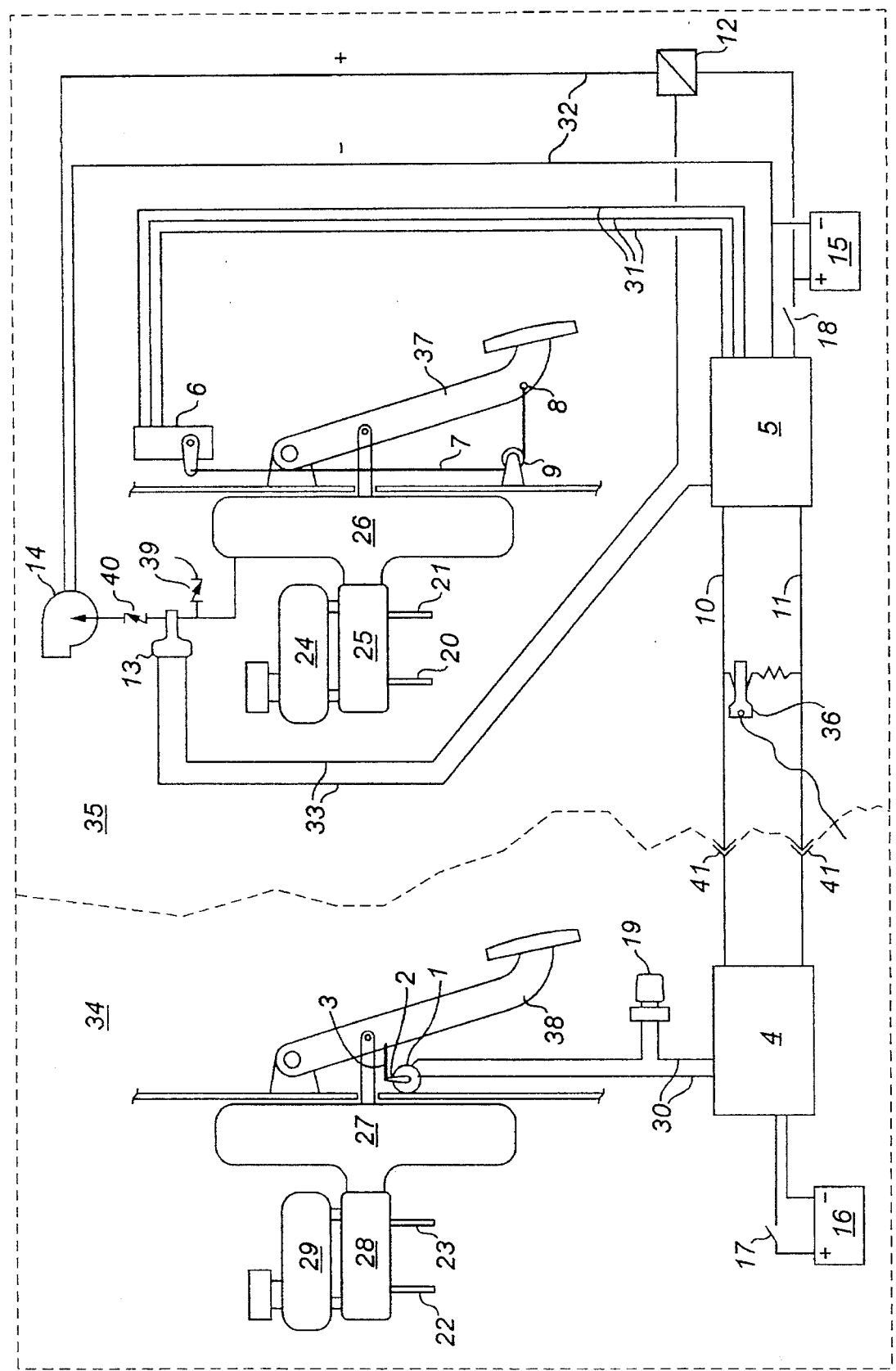
FIG. 2 is schematic representation of an apparatus for simultaneously applying brakes of the towed vehicle when brakes of the towing vehicle are applied.

With reference now specifically to FIG. 2, towed vehicle (35) will typically have a hydraulic brake system which includes a pedal (37), a vacuum booster (26), a hydraulic master cylinder (25) and a reservoir (24). The present apparatus allows remote actuation of the hydraulic brake system in the towed vehicle, as described above, by the operator of the towing vehicle. In order to understand how this remote actuation is achieved one must first have a basic understanding of how the hydraulic brake system of the towed vehicle works in normal operation when the towed vehicle is not being towed by the towing vehicle. In normal operation, the brakes of the towed vehicle are applied by the operator depressing the pedal (38). The vacuum booster (26) is connected to the intake manifold of the vehicle's engine which draws a vacuum within the booster. The piston is slidable within the booster. A valve within the booster is operated as the brake pedal is depressed to vent a portion of the boost to generate a force on the piston which enhances the brake force applied by the operator on the pedal. These braking forces are applied to a piston in the master cylinder (25) which pressurizes hydraulic fluid in the lines (20) (21) to apply the braking forces through the wheel cylinders (not shown).

The apparatus is powered up when ignition switch (17) in towing vehicle (34) is turned on and ignition switch (18) in towed vehicle (35) is turned to accessory position. Encoder (4) is powered up thus powering up decoder (5). As decoder (5) is powered up vacuum switch (13) is closed thus closing contact on relay (12) which in turn completes a circuit through (32) and (33) to run vacuum pump (14) until a vacuum of 17 Hg is produced. Once an operating vacuum of 17 Hg is produced, vacuum switch (13) contacts open shutting down vacuum pump (14). The opening and closing of vacuum switch (13) is accomplished by valves (39) and (40).

When pedal (38) is depressed, applying the brakes of the towing vehicle (34), it in turn moves the arm (2) connected by rod (3) to the pedal position sensor (1), thus sending a signal through the circuit (30) to the encoder (4). Circuits 10 and 11 carry millivolt pulse signals from encoder 4 to decoder 5. The encoder responds sending a pulse through connectors (41) and circuits (10) (11) around a cable activated dynamite switch (36) to the decoder (5). The decoder (5), in turn, sends a digital signal through circuit (31) to a servomotor (6). Circuit 31 includes positive, negative, and signal leads that extend between decoder 5 and servomotor 6. The servomotor (6), in turn, pulls cable (7) routed through pulley (9) with connector (8) moving brake pedal (37) applying the brakes on towed vehicle (35). The brake signal through circuit (30) to encoder can be modified through potentiometer (19) to increase or decrease the braking on the towed vehicle 35, as necessary. In the case of a separation of the two vehicles, due to mechanical failure or improper hookup, the brakes of the towed vehicle (35) will be activated by cable activated dynamite switch (36), thus stopping towed vehicle (35) from running down the road and causing injury or property damage.

It will be apparent to one skilled in the art that this new remote, electronically controlled, braking system allows simultaneous activation of the braking system of motorhome (34) and the braking system of towed vehicle (35), without altering the original brake systems of either unit. It will also be apparent that this apparatus permits the braking system of towed vehicle (35) to operate in a normal manner without a lag time. It will finally be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for simultaneously applying brakes of a towed vehicle having a self contained braking system when brakes of a towing vehicle are applied, comprising:
   a. an auxiliary vacuum pump physically located in the towed vehicle and linked with a vacuum booster in the braking system of the towed vehicle thereby providing vacuum pressure to the vacuum booster when the engine of the towed vehicle is not in operation;
   b. a servomotor linked with a brake pedal in the braking system of the towed vehicle, upon activation the servomotor providing force to move the brake pedal thereby applying the brakes in the towed vehicle;
   c. a pedal position sensor linked with the brake pedal in the towing vehicle;
   d. an encoder linked with the pedal position sensor, the encoder receiving data from the pedal position sensor regarding the brake pedal position of the towing vehicle and encoding such data; and
   e. a decoder linked with the encoder and the servomotor, the decoder receiving an encoded signal from the encoder regarding the brake pedal position of the towing vehicle and sending a decoded signal to the servomotor to move the brake pedal of the towed vehicle thereby creating a master to slave connection between the brake pedal of the towing vehicle and the brake pedal of the towed vehicle.

2. The apparatus as defined in claim 1, wherein means is provided to adjust the signal received by the encoder from the pedal position sensor, thereby adjusting the signal sent from the encoder to the decoder regarding the amount of force exerted by the servomotor upon the brake pedal of the towed vehicle.

3. The apparatus as defined in claim 1, wherein the linkage between the encoder and decoder includes means to trigger a millivolt pulse signal to the decoder to have the servomotor exert a force upon the brake pedal of the towed vehicle should the linkage with the encoder become disconnected.

4. An apparatus for simultaneously applying brakes of a towed vehicle having a self contained braking system when brakes of a towing vehicle are applied, comprising:

a. an auxilliary vacuum pump physically located in the towed vehicle and linked with a vacuum booster in the braking system of the towed vehicle thereby providing vacuum pressure to the vacuum booster when the engine of the towed vehicle in not in operation;

b. a servomotor linked with a brake pedal in the braking system of the towed vehicle, upon activation the servomotor providing force to move the brake pedal thereby applying the brakes in the towed vehicle;

c. a pedal position sensor linked with the brake pedal in the towing vehicle, whereby the brake pedal position of the towing vehicle is sensed;

d. an encoder linked with the pedal position sensor, the encoder receiving data from the pedal position sensor regarding the brake pedal position of the towing vehicle and encoding such data;

e. a decoder linked with the encoder and the servomotor, the decoder receiving an encoded signal from the encoder regarding the brake pedal position of the towing vehicle and sending a decoded signal to the servomotor to move the brake pedal of the towed vehicle thereby creating a master to slave connection between the brake pedal of the towing vehicle and the brake pedal of the towed vehicle;

f. a potentiometer adjustment between the pedal position sensor and the encoder to adjust the signal received by the encoder from the pedal position sensor, thereby adjusting the signal sent from the encoder to the decoder regarding the amount of force exerted by the servomotor upon the brake pedal of the towed vehicle; and g. a cable activated breakaway switch positioned between the encoder and decoder to trigger a millivolt signal to the decoder to have the servomotor exert a force upon the brake pedal of the towed vehicle should the linkage with the encoder become disconnected.

* * * * *